(12) United States Patent
Yan

(10) Patent No.: US 7,468,486 B2
(45) Date of Patent: Dec. 23, 2008

(54) ADJUSTABLE MUD RING SYSTEM

(76) Inventor: Frank Shaochong Yan, 5 Windwood, Irvine, CA (US) 92604

( * ) Notice: Subject to any disclaimer, the term of this patent is extended or adjusted under 35 U.S.C. 154(b) by 0 days.

(21) Appl. No.: 11/834,143

(22) Filed: Aug. 6, 2007

(65) Prior Publication Data

US 2008/0035363 A1 Feb. 14, 2008

Related U.S. Application Data

(60) Provisional application No. 60/822,057, filed on Aug. 10, 2006.

(51) Int. Cl.
*H02G 3/08* (2006.01)

(52) U.S. Cl. .............. 174/58; 174/50; 174/53; 174/57; 174/66; 174/67; 220/3.2; 439/535

(58) Field of Classification Search .......... 174/50, 174/53, 57, 58, 66, 67, 480, 481; 220/3.2, 220/3.3, 3.94, 4.03, 3.7, 3.9; 248/96, 343, 248/906; 439/535; D13/173, 187; D8/353
See application file for complete search history.

(56) References Cited

U.S. PATENT DOCUMENTS

| | | | | |
|---|---|---|---|---|
| 4,794,207 A | * | 12/1988 | Norberg et al. ........... | 174/505 |
| 5,042,673 A | * | 8/1991 | McShane ................. | 220/3.7 |
| 5,931,325 A | | 8/1999 | Filipov | |
| 6,590,155 B2 | * | 7/2003 | Vrame et al. ............ | 174/50 |
| 6,666,419 B1 | * | 12/2003 | Vrame ................... | 248/200.1 |
| 6,765,146 B1 | | 7/2004 | Gerardo | |
| 6,820,760 B2 | | 11/2004 | Wegner | |
| 6,953,894 B2 | | 10/2005 | Ungerman | |
| 7,038,131 B1 | | 5/2006 | Gretz | |
| 7,166,801 B1 | * | 1/2007 | Gretz .................... | 174/53 |
| 2003/0189043 A1 | | 10/2003 | Wegner | |
| 2004/0155036 A1 | | 8/2004 | Wegner | |
| 2005/0051354 A1 | | 3/2005 | Wegner | |
| 2005/0082079 A1 | | 4/2005 | Wegner | |
| 2005/0224249 A2 | | 10/2005 | Wegner | |

* cited by examiner

*Primary Examiner*—Dhiru R Patel
(74) *Attorney, Agent, or Firm*—Michael C. Olson

(57) ABSTRACT

The Adjustable Mud ring consists of a collarless frame, having a central opening for an Extending Member, perimeter fastener openings for connecting to a junction box, and bendable tabs for securing the frame to an Extending Member, which is boxed shaped with a central opening for electrical apparatus, fixed tabs with openings for threading adjustable fasteners into openings in the frame, and bendable tabs for securing the system to a wall. A Grounding Spring Clip, constructed from sheet-metal, folded to create a compressive spring, with an opening for a fastener, allows proper grounding. Add-on Rings are boxed shaped with a central opening, openings on flat, fixed perimeter tabs for threading bolts into to an Extending Member, and bendable tabs for securing the system to a wall. A bracket, with openings for fasteners for attaching the assembly to wall members, can be made a part of the frame.

13 Claims, 10 Drawing Sheets

(Detail A)

ADJUSTABLE MUD RING SYSTEM

BACKGROUND OF THE INVENTION

Typically, in construction of commercial, industrial and some residential space, building codes require the use of metal conduit, for holding electrical wires, which terminate at an electrical junction box. A variety of electrical switches and receptacles can be mounted on a Mud Ring inside the junction box. The conduit and junction boxes are mounted within the walls of the building and the Mud Rings is attached to the junction box. The Mud Ring should extend through an opening in the wall and be flush to the exterior surface of the wall, the switch or receptacle is connected to the Mud Ring, the electrical fixture extends through the wall opening and a cover plate is normally attached to the exterior of the wall, hiding electrical connections.

A problem often encountered is that, because the junction box assembly is normally installed prior to the installation of the wall surface materials, it is sometimes difficult to estimate the proper position of the Mud Ring. Further, if the exterior surface of the wall is changed from the original specifications, the yoke of the switch or receptacle may no longer be seated securely on the Mud Ring for proper grounding while still keeping flush with the wall.

While prior attempts to deal with this problem have been made, each has problems associated with the design or is costly. Among these are U.S. Pat. Nos. 5,931,325, 6,765,146, 6,820,760, 6,953,894, and 7,038,131. Some systems require a special junction box, while others provide telescoping adaptors that limit the size of acceptable switches and receptacles. Other systems require a collar be present on the Mud ring which limits the travel of the telescoping adapter into the junction box. Others do not have a secure means for attachment of the extending member, allowing for movement and incomplete grounding. None of the systems allow for multiple extending members that are equipped with some of the thicker surface finish materials currently being used in the industry.

The present invention relates to a system which allows for the use of a conventional junction box, such as a 4S, 11/16, Three Gang, Four Gang, Five Gang, Six Gang, Seven Gang Eight Gang, Nine Gang or Ten Gang box. This saves cost when the finish surface material on a wall is changed to a thicker material because it allows for the use of the currently installed junction box with the present invention to secure the junction box to the new, thicker finish surface material. Further, the present invention features a collarless Mud ring which allows for maximum interior space inside the box for acceptance of larger switches or receptacles and maximum travel into the junction box itself. Through the use of bendable tabs, the invention provides more secure attachment of the extending members and a continuous ground of the system. Bendable tabs on the Mud Ring frame provide constant contact between the frame and the Extending Member for proper grounding, while also preventing the Extending Member from rocking. Bendable tabs on the extending members provide for firm attachment of the extending member to the exterior wall surface. The system also allows for Add-On Rings, which are additional Extending Members, to provide for additional telescoping beyond the range of the a single Extending Member when it is fully extended. The Add-On Rings have tabs which create a flat surface connection to ensure proper grounding between the Add-On ring and the Extending Member. The tabs also allow for installation of unlimited additional Add-on Rings, to accommodate varying thicknesses of the exterior wall schedules. The system also provides for an improved ground connection for the electrical switch or receptacle through the use of a Grounding Spring Clip. Finally, the present invention may be modified to include a bracket on the Mud Ring for attaching the Mud Ring to wall studs. This provides improved stability for the entire assembly.

WRITTEN DESCRIPTION

Figure 1:
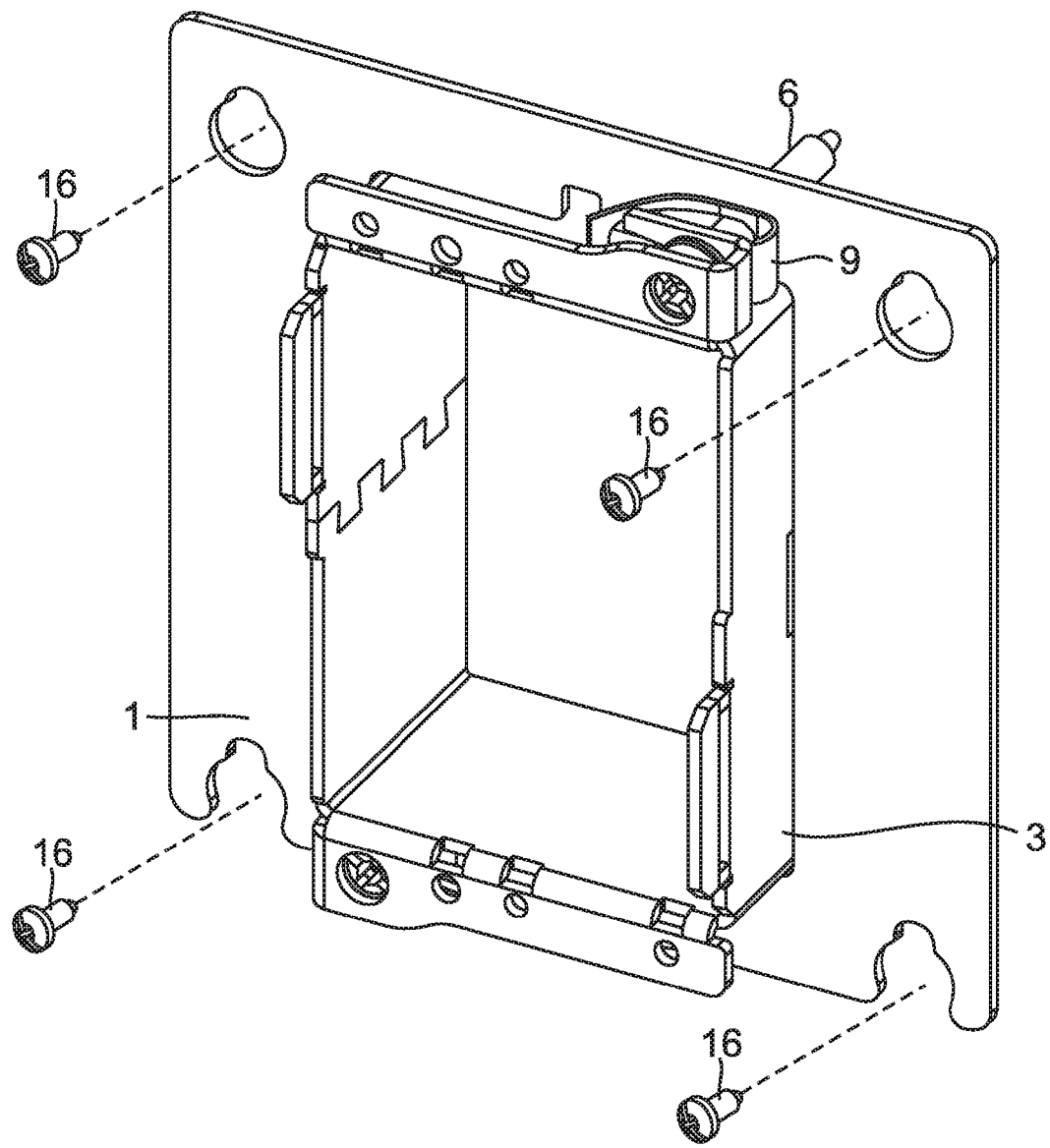
FIG. 1 contains a trimetric view of the Adjustable Mud Ring System depicting the Mud Ring, Extending Member and the Grounding Spring Clip according to the preferred embodiment of the present invention.
Figure 2:
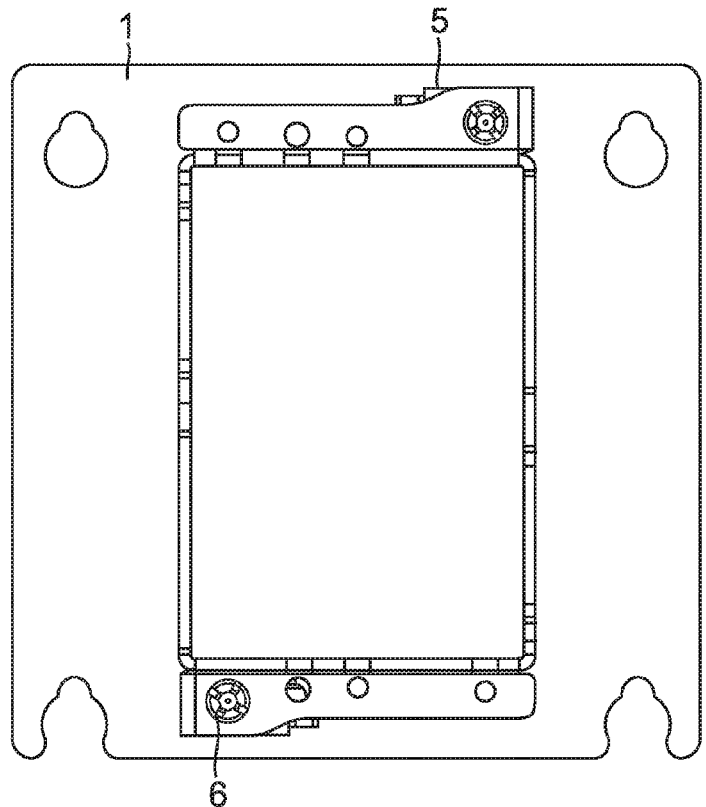
FIG. 2 contains a frontal view of the Adjustable Mud Ring System depicting the Mud Ring, Extending Member and the Grounding Spring Clip according to the preferred embodiment of the present invention.
Figure 3:
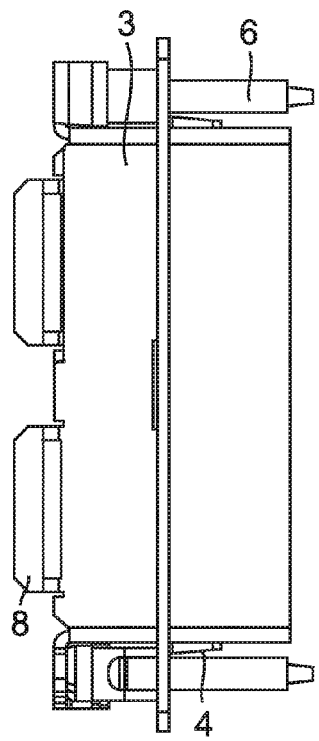
FIG. 3 contains side view of the Adjustable Mud Ring System depicting the Mud Ring, Extending Member and the Grounding Spring Clip according to the preferred embodiment of the present invention.
Figure 4:
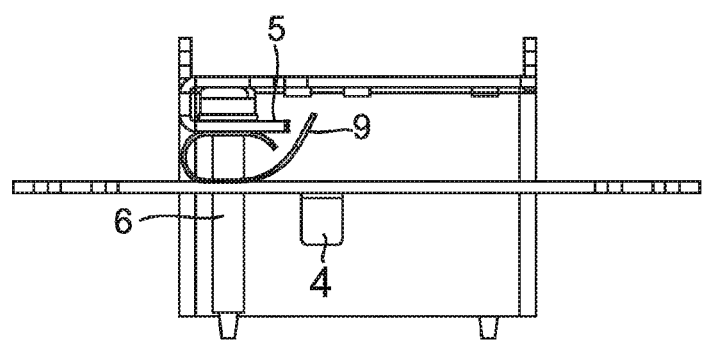
FIG. 4 contains an end view of the Adjustable Mud Ring System depicting the Mud Ring, Extending Member and the Grounding Spring Clip according to the preferred embodiment of the present invention.
Figure 5:
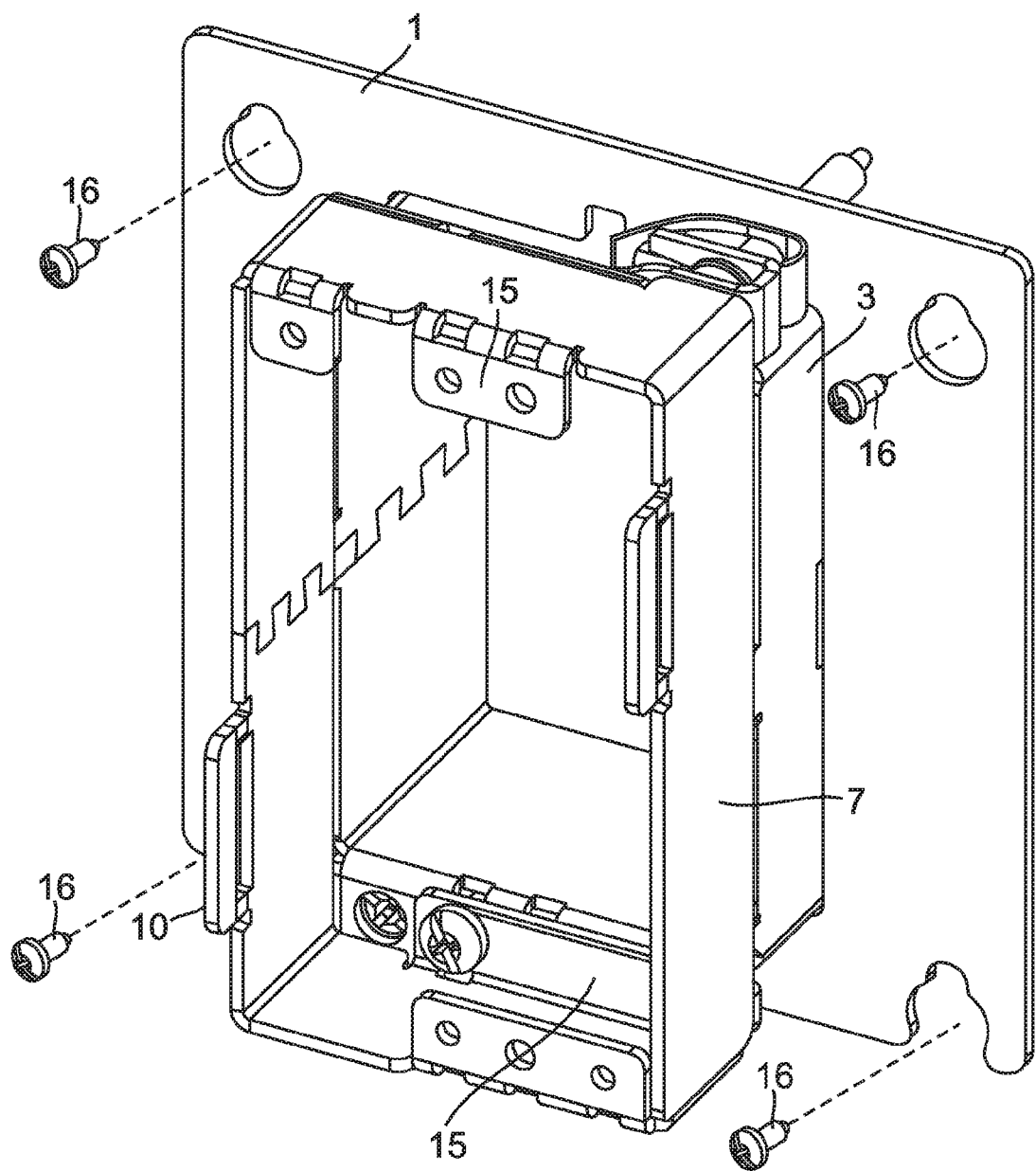
FIG. 5 contains a trimetric view of the Adjustable Mud Ring System depicting the Mud Ring, Extending Member and the tabs for attachment of the Extending Member to the Mud Ring or another Extending Member.
Figure 6:
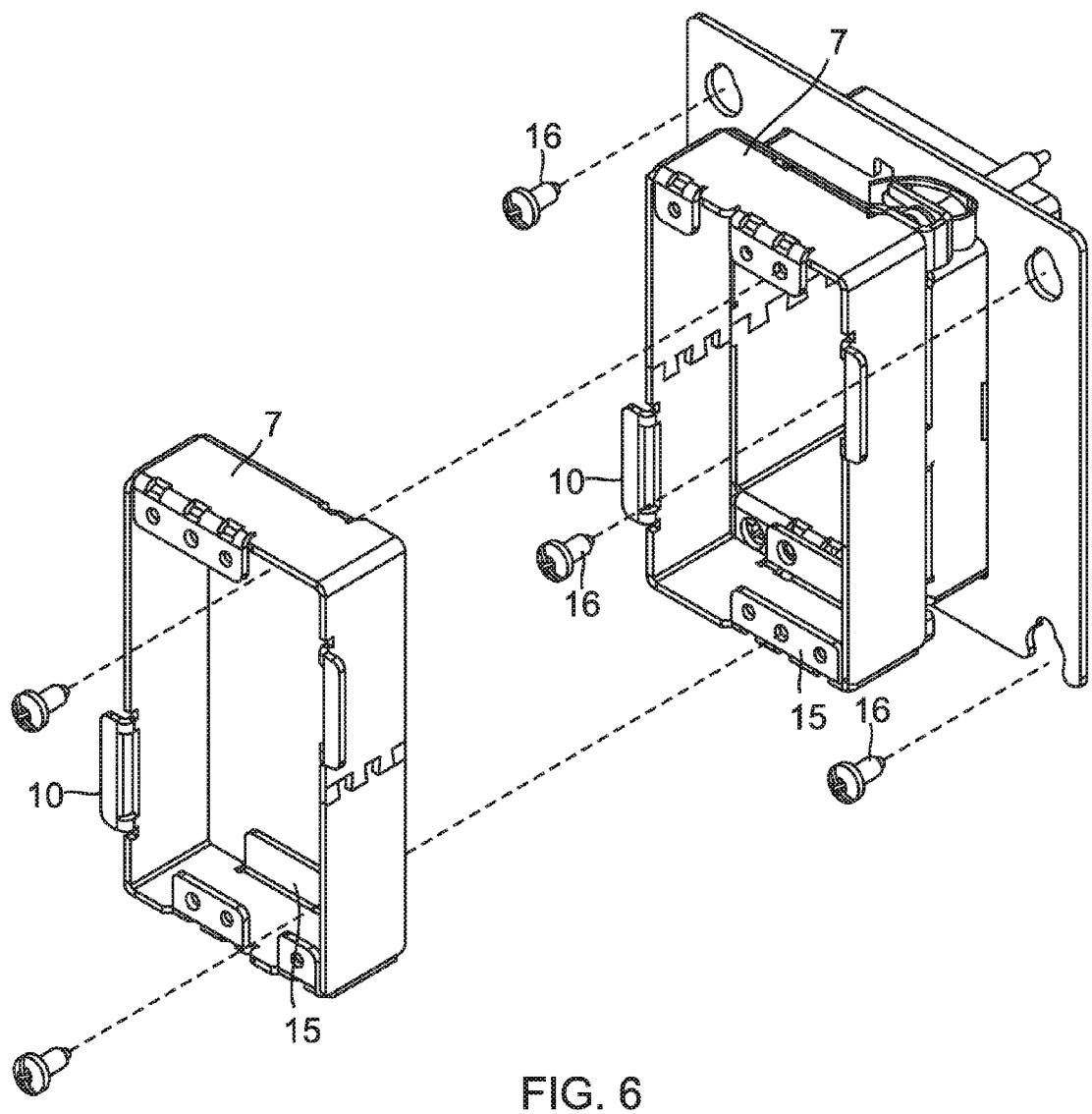
FIG. 6 contains a trimetric view of the Adjustable Mud Ring System depicting a method of attachment of the Add-On Ring to the Extending Member and of the bendable tab for securing the Adjustable Mud Ring system to the exterior surface of the wall.
Figure 7:
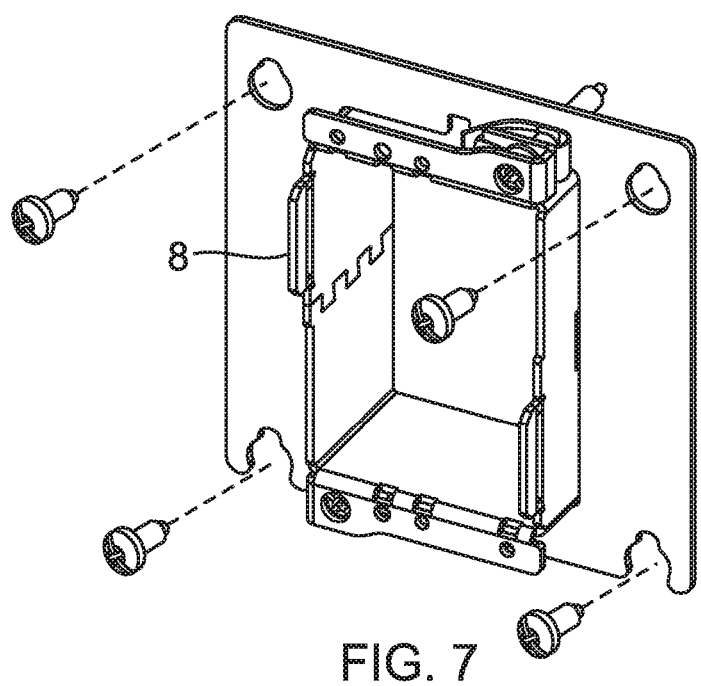
FIG. 7 contains a trimetric view of the Adjustable Mud Ring System depicting the bendable tab for securing the Adjustable Mud Ring system to the exterior surface of the wall.
Figure 8:
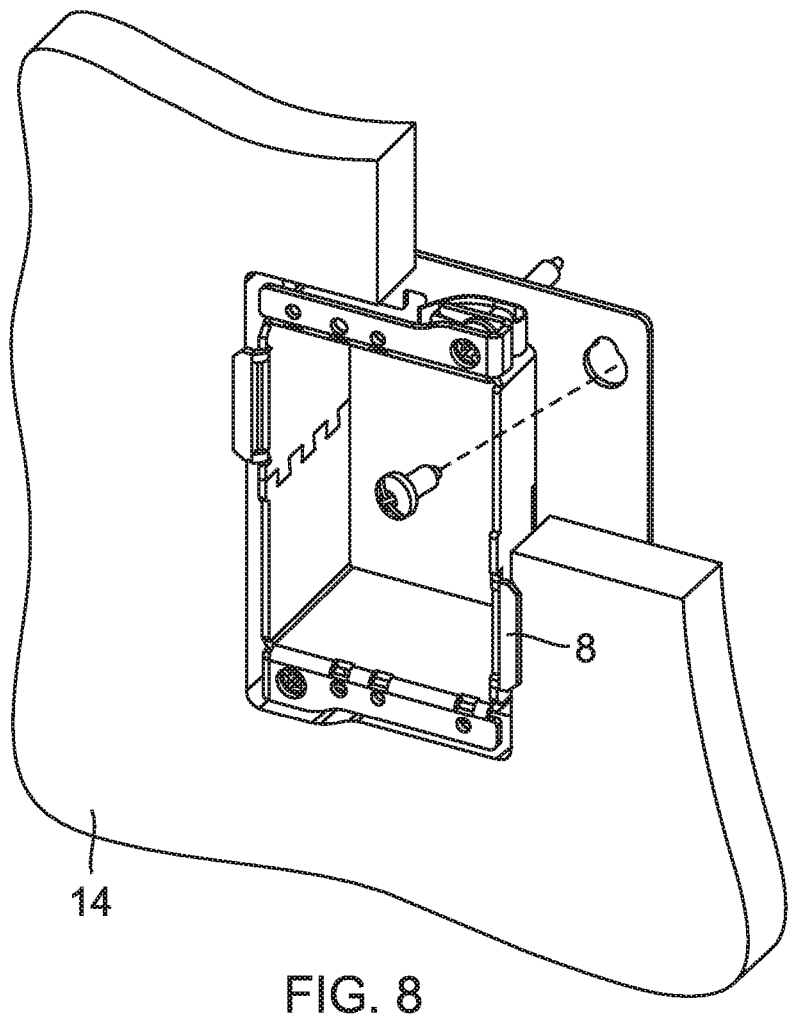
FIG. 8 contains a trimetric view of the Adjustable Mud Ring System depicting the bendable tab for securing the Adjustable Mud Ring system to the exterior surface of the wall.
Figure 9:
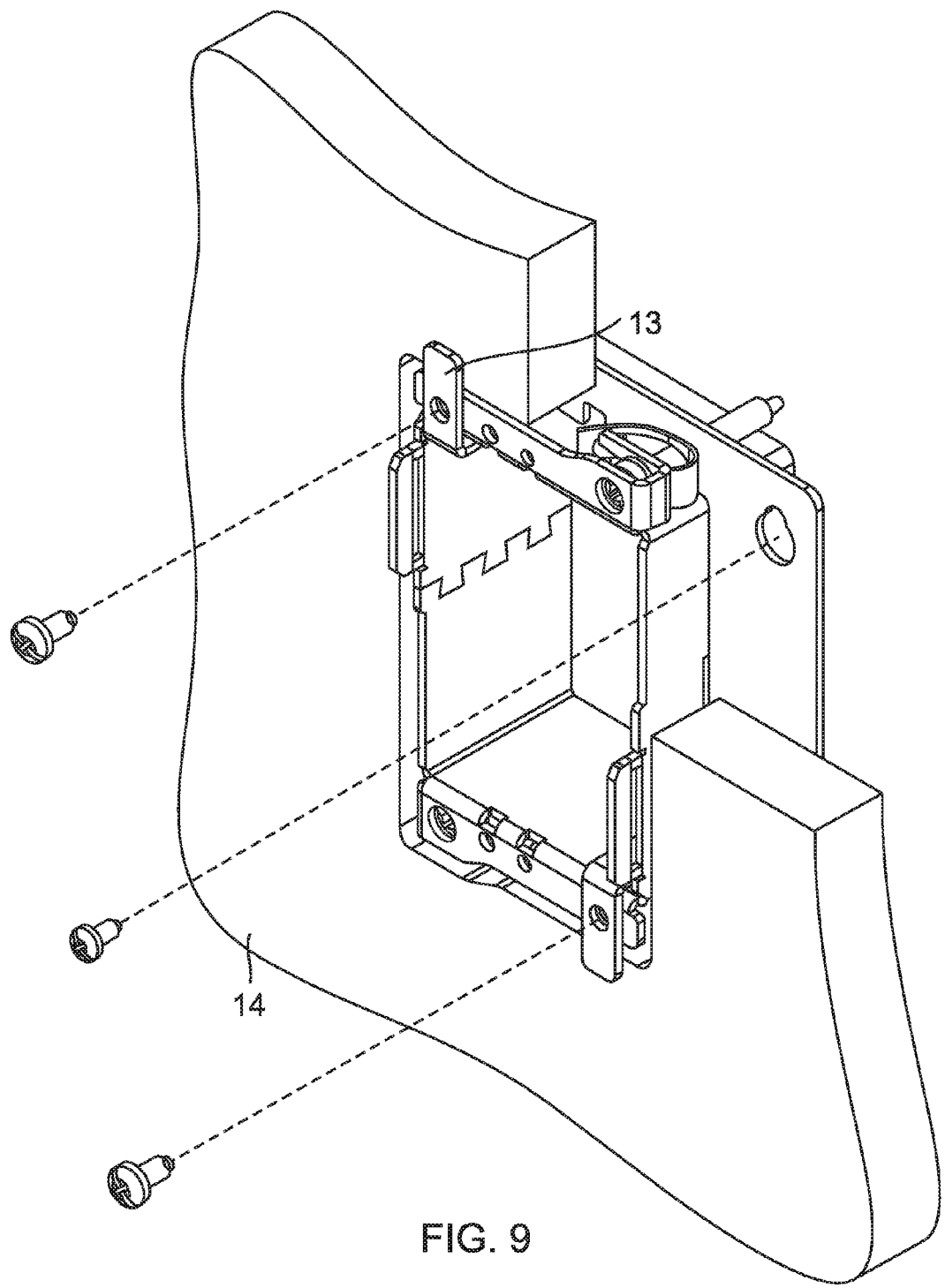
FIG. 9 contains a trimetric view of the Adjustable Mud Ring System depicting the removable angled bracket for securing the Adjustable Mud Ring system to the exterior surface of the wall according to an alternate embodiment of the present invention.
Figure 10:
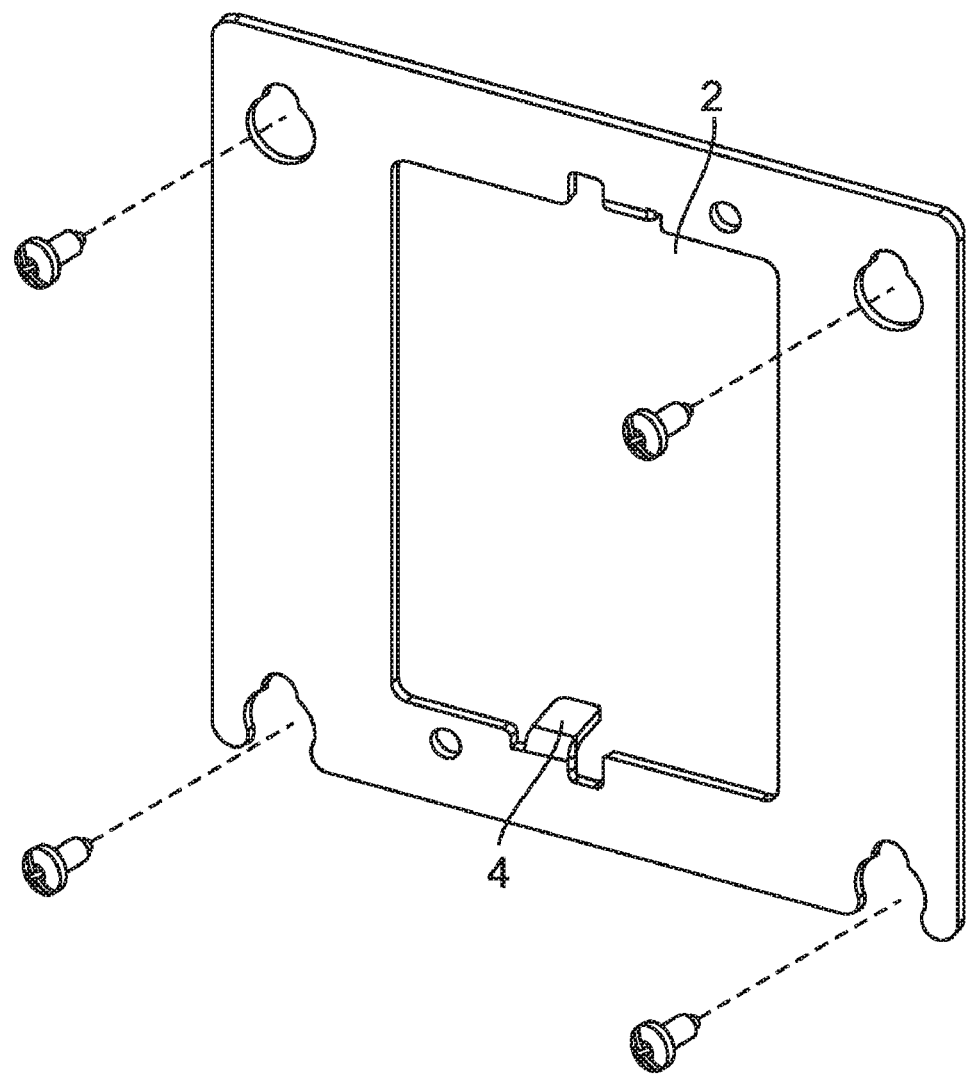
FIG. 10 contains a trimetric view of the Adjustable Mud Ring System depicting the central opening of the Mud Ring frame and a bendable tab for securing the frame to the Extending Member according to an alternate embodiment of the present invention.
Figure 11:
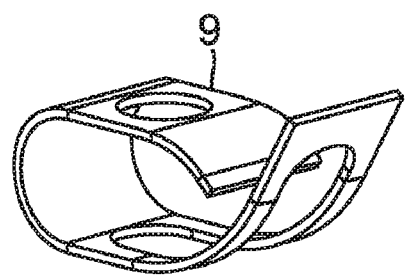
FIG. 11 contains a trimetric view of the Grounding Spring Clip according to the preferred embodiment of the present invention.
Figure 12:
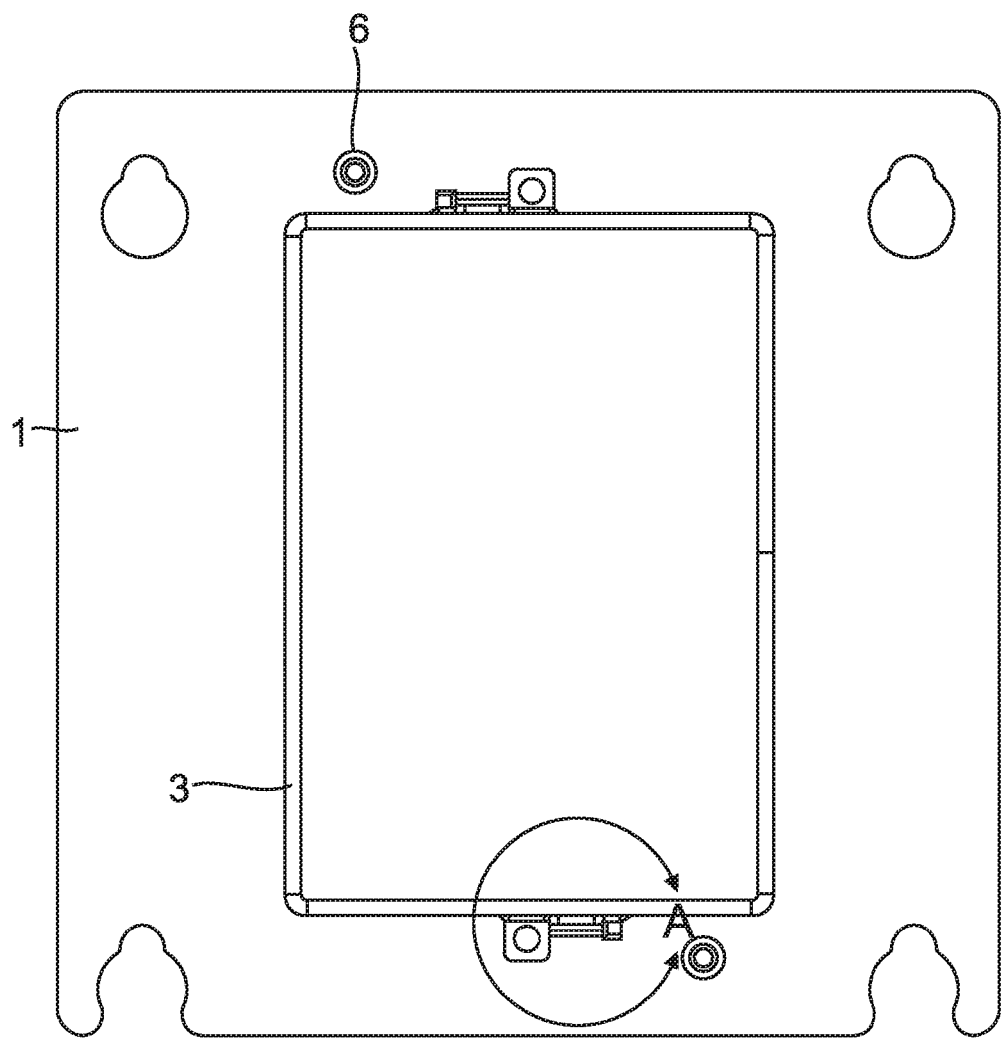
FIG. 12 contains a back view of the Adjustable Mud Ring System according to the preferred embodiment of the present invention.
Figure 13:
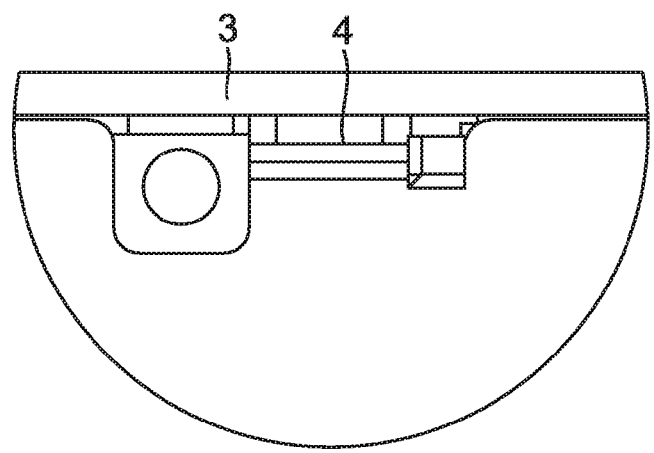
FIG. 13 contains an end scaled view of the Adjustable Mud Ring System depicting the bendable tabs for securing the Mud Ring Frame and the Extending Member according to the preferred embodiment of the present invention.
Figure 14:
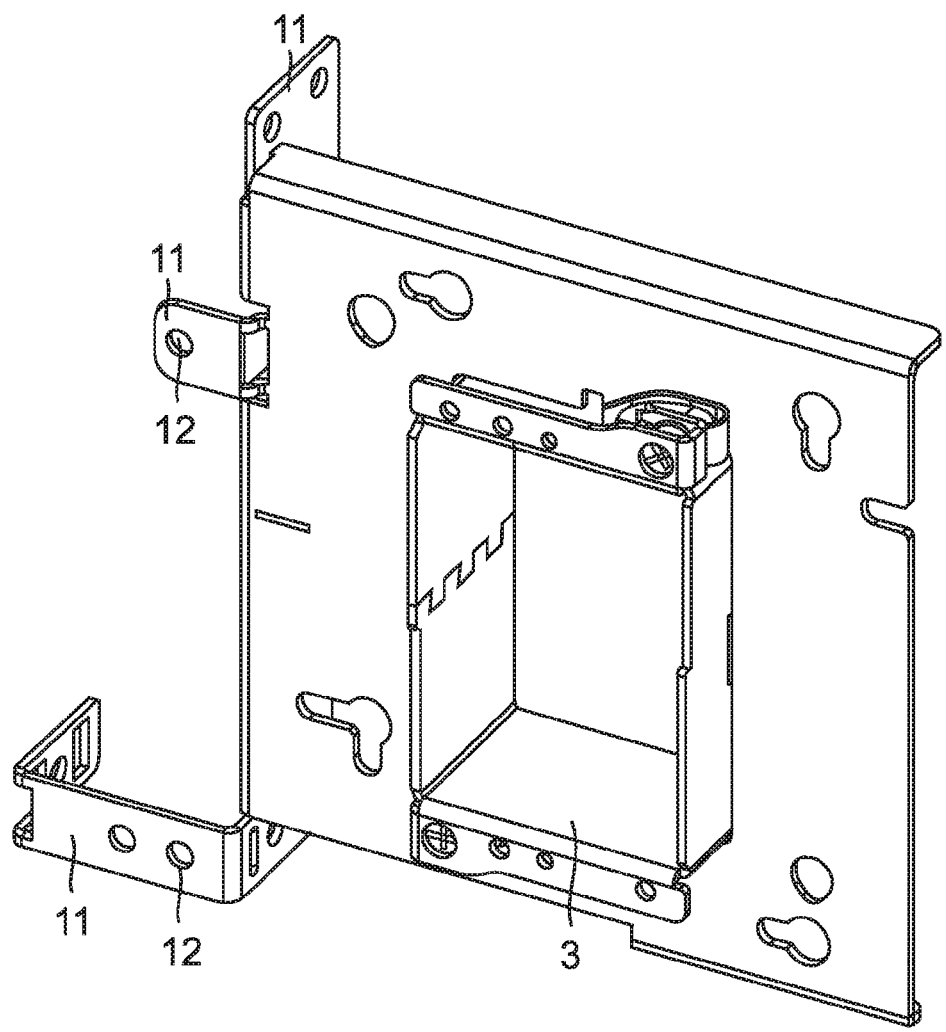
FIG. 14 contains a trimetric view of the Adjustable Mud Ring System depicting an alternative design for the Mud Ring frame with brackets for attachment to wall framing for additional stability according to an alternate embodiment of the present invention.
Figure 15:
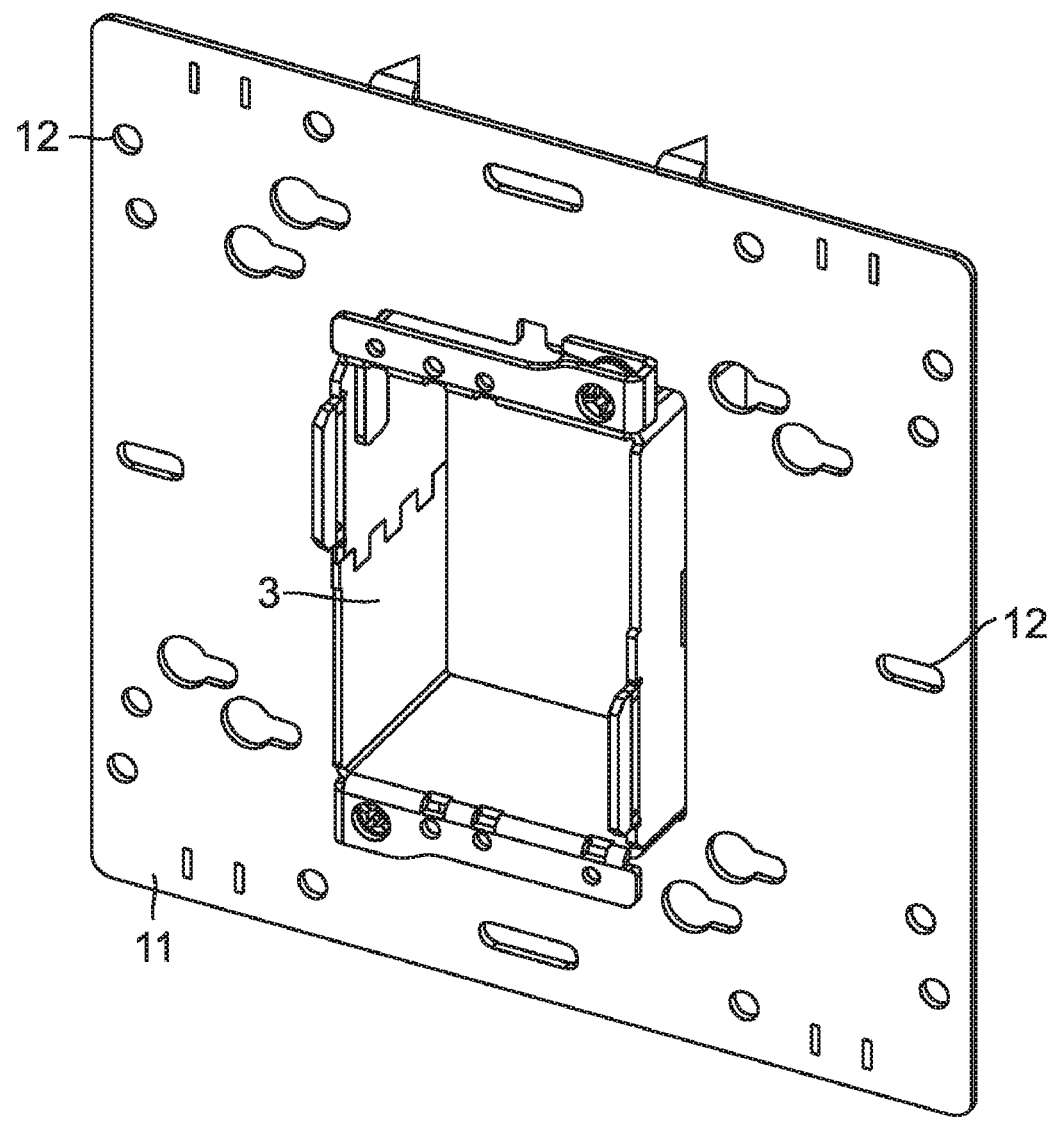
FIG. 15 contains a trimetric view of the Adjustable Mud Ring System depicting an alternative design for the Mud Ring frame bracket.

This invention relates to an Adjustable Mud ring which is attached to a conventional electrical junction box to enable positioning the top level of the Mud Ring for a selectable distance from the junction box. Reference is made to the accompanying drawings which detail the present invention.

An object of the invention is to provide for an adjustable collarless Mud ring that can fit on a conventional electrical junction box and said Mud Ring being adjustable without removing the finish material on the exterior of the wall and also unlimited Add-on Rings which extend the range of the adjustable Mud Ring to meet wall schedules and scheduled changes. A further object of the invention is to provide for a secure ground for the electrical switch or receptable throughout the range of possible adjustments of the Mud Ring. A further object of the invention is to provide for a bracket on the Mud Ring which allows the assembly to be securely fastened to a wall stud or other member at their time of installation.

The first objective is accomplished through the use of an adjustable Mud Ring system which attaches to a standard electrical junction box. The system consists of a Mud Ring (1) which attaches to the electrical junction box. The Mud Ring is a collarless frame with a central opening (2) for receiving an Extending Member (3). The Mud Ring frame has openings on the perimeter for firmly affixing, with bolts (16) or other fasteners, the Mud Ring to threaded openings in the electrical junction box. The system also includes an Extending Member (3) which fits into the central opening of the Mud Ring frame. Bendable tabs (4) on the Mud Ring frame provide constant contact between the frame and the Extending Member for proper grounding, while also preventing the Extending Member from rocking in the Mud Ring Frame. The Extending Member has bendable tabs (8) for securing the system to the exterior wall (14). Alternatively, removable angled brackets (13) can be attached to the Extending Member with bolts or other fasteners. The Extending Member is boxed shaped with a central opening for receiving a switch or receptable yoke. The perimeter of the Extending Member has a plurality of tabs (5) through which attachment bolts (6) can be threaded into threaded openings in the Mud Ring frame. The Extending Member can be adjusted over a predetermined range by tightening or loosening the attachment bolts. Because the attachment bolts are external to the central opening of the Extending Member, the Extending Member can accommodate a wider range of sizes of switches and receptacles. Also, unlike other systems, because the adjustment bolts are external to the central opening, there is nothing inside the Extending Member to catch or damage the wires during installation and telescoping. Add-on Rings (7) can be attached to the Extending Member to increase the range of movement of the Extending Member.

The second objective is accomplished through the use of a Grounding Spring Clip, which is constructed from an electrically conductive sheet-metal material and formed with flat surfaces that provide for continuous electrical conductivity between the components of the Mud Ring system. The Grounding Spring Clip is folded in such a way as to create a compressive springing force. The Grounding Spring Clip (9) is placed between the tab (5) of the Extending Member (3) and the threaded opening of the Mud Ring (1). The Grounding Spring Clip has an opening through which the attachment bolt (6) passes. The Grounding Spring Clip is folded back in such as way as to create a compressing springing force between the Mud Ring and the Extending Member. The Grounding Spring Clip provides a continuous surface contact between the Extending Member and the Mud Ring creating proper grounding of the entire system. The Add-on Rings (7) have tabs (15) which create a flat surface on the Add-on Ring so that proper grounding is present between the Add-on Ring and the Extending Member. The Add-On Ring Bendable Tabs (10) can be bent during installation to secure the system to the wall's exterior surface (14). Alternatively, removable angled brackets (13) can be installed on the Add-On Ring as an opinion.

The third objective is accomplished through the use of a bracket (1) which is made a part of the Mud Ring frame (1). The bracket has openings (12) through which bolts or other fasteners may be placed for attaching the assembly to wall studs or other wall framing members.

I claim:

1. An adjustable mud-ring system comprising:
   a Mud Ring with a central opening and a plurality of smaller threaded openings spaced about the central opening;
   An Extending member including sidewalls having an inner periphery, said Extending member being slidable with respect to the central opening of said Mud Ring, and said Extending member having a plurality of tabs spaced about the perimeter of the Extending member with openings for adjustable fasteners;
   at least one bendable tab on said Mud Ring, said tab being extendable into the central opening and contacting the sidewalls of the Extending member;
   a plurality of adjustable fasteners for attaching the Extending member to the Mud Ring.

2. The Adjustable mud-ring system of claim 1 wherein at least one of the adjustable fasteners connecting the Extending member to the Mud Ring includes a Grounding Spring Clip.

3. The adjustable mud-ring system of claim 1 wherein the Extending member has at least one bendable tab for securing the adjustable mud-ring system to an exterior wall surface.

4. The adjustable mud-ring system of claim 1 wherein the Extending member has at least one removable angled bracket for securing the adjustable mud-ring system to an exterior wall surface.

5. An adjustable mud-ring system comprising:
   a Mud Ring with a central opening and a plurality of smaller threaded openings spaced about the central opening;
   An Extending member including sidewalls having an inner periphery, said Extending member being slidable with respect to the central opening of said Mud Ring, and said Extending member having a plurality of tabs spaced about the perimeter of the Extending member with openings for adjustable fasteners and an Add-on ring;
   at least one bendable tab on said Mud Ring, said tab being extendable into the central opening and contacting the sidewalls of the Extending member;
   a plurality of adjustable fasteners for attaching the Extending member to the Mud Ring;
   Said Add-on Ring including sidewalls having an inner periphery, and a plurality of tabs extending into the inner periphery of the Add-on Ring, the tabs having openings for fasteners to attach to the tabs on the Extending member;
   a plurality of adjustable fasteners for attaching the Add-on Ring to the Extending member.

6. The adjustable mud-ring system of claim 5 wherein the dimensions of the inner periphery of the Add-on Ring and the Extending member are identical.

7. The adjustable mud-ring system of claim 5 wherein at least one of the adjustable fasteners connecting the Extending member to the Mud Ring includes a Grounding Spring Clip.

8. The adjustable mud-ring system of claim 5 wherein the Add-on Ring has at least one bendable tab for securing the adjustable mud-ring system to an exterior wall surface.

9. The adjustable mud-ring system of claim 5 wherein the Add-on Ring has at least one removable angled bracket for securing the adjustable mud-ring system to an exterior wall surface.

10. An adjustable mud-ring system comprising:
 a Mud Ring with a central opening and a plurality of smaller threaded openings spaced about the central opening, said Mud Ring having brackets with openings for fastening the Mud Ring to wall support members;
 An Extending member including sidewalls having an inner periphery, said Extending member being slidable with respect to the central opening of said Mud Ring, and said Extending member having a plurality of tabs spaced about the perimeter of the Extending member with openings for adjustable fasteners;
 at least one bendable tab on said Mud Ring, said tab being extendable into the central opening and contacting the sidewalls of the Extending member;
 a plurality of adjustable fasteners for attaching the Extending member to the Mud Ring.

11. The adjustable mud-ring system of claim 10 wherein at least one of the adjustable fasteners connecting the Extending member to the Mud Ring includes a Grounding Spring Clip.

12. The adjustable mud-ring system of claim 10 wherein the Extending member has a least one bendable tab for securing the adjustable mud-ring system to an exterior wall surface.

13. The adjustable mud-ring system of claim 10 wherein the Extending member has at least one removable angled bracket for securing the adjustable mud-ring system to an exterior wall surface.

* * * * *